United States Patent
Mullins

(10) Patent No.: US 11,080,344 B2
(45) Date of Patent: *Aug. 3, 2021

(54) CLOUD-NATIVE DOCUMENTS INTEGRATED WITH LEGACY TOOLS

(71) Applicant: Microsoft Technology Licensing, LLC, Redmond, WA (US)

(72) Inventor: Christopher Lee Mullins, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 300 days.

This patent is subject to a terminal disclaimer.

(21) Appl. No.: 16/178,895

(22) Filed: Nov. 2, 2018

(65) Prior Publication Data
US 2019/0073424 A1   Mar. 7, 2019

Related U.S. Application Data

(63) Continuation of application No. 14/754,148, filed on Jun. 29, 2015, now Pat. No. 10,146,873.

(51) Int. Cl.
*G06F 16/00* (2019.01)
*G06F 16/951* (2019.01)
*G06F 16/93* (2019.01)
*G06F 16/182* (2019.01)

(52) U.S. Cl.
CPC .......... *G06F 16/951* (2019.01); *G06F 16/182* (2019.01); *G06F 16/93* (2019.01)

(58) Field of Classification Search
None
See application file for complete search history.

(56) References Cited

U.S. PATENT DOCUMENTS

2006/0101285 A1*  5/2006  Chen ...................... H04L 63/08
                                                        713/193
2006/0136389 A1*  6/2006  Cover .................. G06F 9/44526
2008/0126357 A1*  5/2008  Casanova ........... G06F 16/1844
(Continued)

FOREIGN PATENT DOCUMENTS

CN          1866841 A     11/2006
CN        100459506 C      2/2009
(Continued)

OTHER PUBLICATIONS

"Summon to Attend Oral Proceedings Issued in European Patent Application No. 16736346.4", dated Apr. 20, 2020, 7 Pages.
(Continued)

*Primary Examiner* — Bai D Vu
(74) *Attorney, Agent, or Firm* — Michael Best & Friedrich LLP

(57) ABSTRACT

A facility for providing document contents from a server is described. The facility receives from a separate client computing system a retrieval request to return a document identified by a document identifier contained by the retrieval request. The retrieval request has been originated by the client computing system in response to an open request for a file stored on the client computing system that contains the document identifier. The facility transmits to the client a response containing at least a portion of a document to which the document identifier contained by the retrieval request corresponds.

20 Claims, 10 Drawing Sheets

(56) References Cited

U.S. PATENT DOCUMENTS

| | | | |
|---|---|---|---|
| 2015/0052354 A1 | 2/2015 | Purohit | |
| 2015/0058439 A1 | 2/2015 | Afergan et al. | |
| 2015/0304306 A1* | 10/2015 | Ponsford | G06F 21/6218 713/171 |
| 2016/0148156 A1 | 5/2016 | Gaucher et al. | |
| 2016/0196280 A1* | 7/2016 | Procopio | G06F 21/6218 707/770 |
| 2016/0380937 A1* | 12/2016 | Murphy | H04L 51/08 709/206 |
| 2017/0277774 A1 | 9/2017 | Eigner et al. | |

FOREIGN PATENT DOCUMENTS

| | | |
|---|---|---|
| CN | 101765979 A | 6/2010 |
| CN | 102902934 A | 1/2013 |
| CN | 102932164 A | 2/2013 |
| CN | 103493035 A | 1/2014 |
| CN | 104182451 A | 12/2014 |
| CN | 104281684 A | 1/2015 |
| CN | 104854596 A | 8/2015 |
| CN | 103166992 B | 12/2016 |
| KR | 20170110420 A | 10/2017 |

OTHER PUBLICATIONS

"First Office Action and Search Report Issued in Chinese Patent Application No. 201680038764.7", dated Aug. 5, 2020, 10 Pages.

"Office Action Issued in European Patent Application No. 16736346.4", dated Jun. 17, 2019, 7 Pages.

"Second Office Action and Search Report Issued in Chinese Patent Application No. 201680038764.7", dated Feb. 9, 2021, 9 Pages.

"Office Action Issued in European Patent Application No. 16736346.4", dated Mar. 11, 2021, 4 Pages.

* cited by examiner

300

Thank you for buying this
Microsoft product!
We value your business.

301

FIG. 3 fragment version instance directory table ⟋ 1000

| fragment version ID | server ID | |
|---|---|---|
| 12345498 | 9103 | ⟋ 1001 |
| 12345498 | 1231 | ⟋ 1002 |
| 91285817 | 9103 | ⟋ 1003 |
| 91285817 | 2254 | ⟋ 1004 |
| 65489151 | 4545 | ⟋ 1005 |
| 65489151 | 9103 | ⟋ 1006 |
| 84321332 | 1231 | ⟋ 1007 |
| 84321332 | 4658 | ⟋ 1008 |
| ⟍ 1011 | ⟍ 1012 | |

*FIG. 10* fragment version instance content table ⟋ 1100

| fragment version ID | update time | fragment contents | |
|---|---|---|---|
| 91285817 | 1/16/1987 16:02:54 | \<image data\> | ⟋ 1101 |
| 65489151 | 9/15/2002 9:17:12 | Microsoft Corporation . . . | ⟋ 1102 |
| 12345498 | 1/3/2001 10:32:19 | Microsoft Corp. . . . | ⟋ 1103 |
| ⟍ 1111 | ⟍ 1112 | ⟍ 1113 | |

*FIG. 11*

CLOUD-NATIVE DOCUMENTS INTEGRATED WITH LEGACY TOOLS

RELATED APPLICATIONS

This application is a continuation of U.S. patent application Ser. No. 14/754,148 filed Jun. 29, 2015, the entire content of which is incorporated by reference herein.

BACKGROUND

Electronic documents such as word processing documents, spreadsheets, etc. are typically monolithic, in the sense that each document's entire contents are commonly stored in a single file. In some cases, this monolithic document file is stored on a single storage device in a single location, while in others, entire copies of it are stored on multiple storage devices in different locations as a technique for ensuring against the loss or unavailability of the document and its contents in the case of storage device failure.

BRIEF DESCRIPTION OF THE DRAWINGS

FIGS. 3-5 are display diagrams showing the editing and display of a document incorporating a shared document fragment.

FIG. 10 is a table diagram showing sample contents of a fragment version instance table used by the facility in some embodiments to store information about fragment version instances.

FIG. 11 is a table diagram showing sample contents of a fragment version instance content table used by the facility in some embodiments to store fragment version instance content.

SUMMARY

Figure 1:
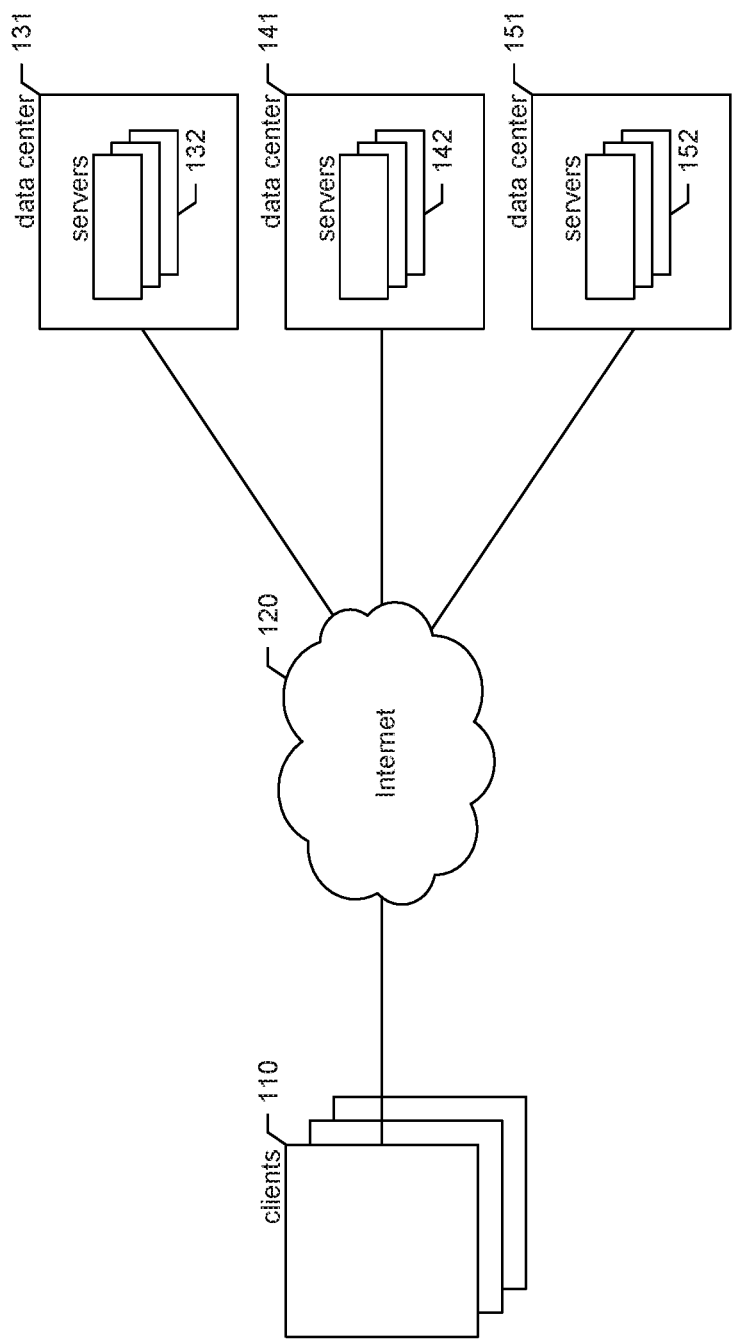
FIG. 1 is a network diagram showing the environment in which the facility operates in some embodiments.

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for providing document contents from a server is described. The facility receives from a separate client computing system a retrieval request to return a document identified by a document identifier contained by the retrieval request. The retrieval request has been originated by the client computing system in response to an open request for a file stored on the client computing system that contains the document identifier. The facility transmits to the client a response containing at least a portion of a document to which the document identifier contained by the retrieval request corresponds.

DETAILED DESCRIPTION

The inventors have recognized significant disadvantages of conventional monolithic documents. In particular, such conventional monolithic documents are typically not easily accessible from disparate geographic locations; are not well-secured against disaster and outage survivability; and are difficult to share content between.

Accordingly, the inventors have conceived and reduced to practice a software and/or hardware facility that maintains documents in a geographically-distributed cloud service ("the facility"). In some embodiments, the facility stores documents using a construct called a "document fragment," or simply "fragment," which is a unit of document content represented separately by the facility. The document is comprised of a single "root fragment," which can directly contain content, as well as containing fragment references referring to other fragments. Those fragments referred to by the root fragment can themselves directly contain content and fragment references to other fragments, and so on. When a document is opened, the facility typically collects and synthesizes its contents by retrieving the root fragment, retrieving other fragments referred to by fragment references in the root fragment, retrieving further fragments referred to by fragment references in those fragments, and so on. In some embodiments, any fragment can be treated as a document, in the sense that it can be opened by an editing or presentation application as the root fragment. In some embodiments, the facility stores the fragments making up users' documents in a cloud-based service, where they can be accessed from virtually any location. In some embodiments, this cloud-based service uses a technique called "erasure coding" in which it decomposes, or "shreds," a fragment defined by a document author into multiple smaller constituent pieces, or "shreds," each of which the facility stores on multiple storage devices in different data centers in different geographic locations to provide disaster and outage survivability. When the cloud-based service receives a request for a fragment, it retrieves and combines these shreds to reconstitute the fragment. In many cases, documents stored this way by the facility are easily accessible from disparate geographic locations; are well-secured against disaster and outage survivability; and, as is discussed further below, are well-suited to share content between.

The inventors have further recognized that documents stored in the cloud either in the manner described above or in a variety of other manners, pose a certain level of incompatibility with legacy systems designed for locally stored, monolithic documents. For example, the following common operations are typically implemented in a way that depends on the local presence of a monolithic document, i.e., one stored in a single, locally-present file: (a) issuing a file system command to open a file containing a document in order to view or edit the document; (b) crawling the file stored in a file system in order to build a search index for searching the file system; (c) analyzing a person's work output among the documents he or she authors, such as for productivity analysis, writing quality analysis, or writing style, such as to aid voice transcription for that person; (d) analyzing documents received by a user, such as those received in files attached to email messages, such as to check for viruses; (e) analyzing documents sent by a user, such as those sent in files attached to email messages, such as to demonstrate compliance with securities regulations, or to log or filter documents sent out of an organization for information security purposes.

Accordingly, in some embodiments, the facility provides a mechanism for maintaining local proxies of such "cloud-native documents" through which legacy tools such as those described above can seamlessly interact with materialized, apparently local and monolithic versions of such documents. In some embodiments, a user interacting with a particular cloud-native document can request from the facility a local proxy of that cloud-native document. In some embodiments, the local proxy created by the facility in response is a small file containing the information needed by the cloud-based service to materialize the document, such as a document identifier used by the cloud-based service for this purpose. In general, the user can do anything with the local proxy that the user could do with any other file: store it in the file system of a primary local storage device, such as an internal hard drive or flash drive; store it in the file system of a secondary local storage device, such as an external hard drive or flash drive; upload it to any cloud-based storage service; publish it on a social media site; send it to himself or herself or another user via email, instant messaging, text messaging, etc. When the user takes such actions with the file constituting the local proxy, this local proxy file becomes accessible to legacy tools to the same degree as files containing local monolithic documents handled in the same way. When a legacy tool attempts to access a local proxy file stored or sent in any of the manners described above, the facility intercedes to materialize a temporary local representation of the corresponding document using the contents of the local proxy file, and make the temporary local representation available to the legacy tool. The legacy tool can then operate on the temporary local representation in the same manner as it operates on local, monolithic documents. In some embodiments, the facility can be configured to reflect in certain ways in the cloud-native document modifications made by the legacy tool to the temporary local representation.

In some embodiments, the facility identifies local proxies by assigning them a file type and/or file extension that distinguishes them from files that are not local proxies. In some embodiments, the facility manages the operation of local proxies by use of an operating system extensibility mechanism such as Shell Extension Handlers implemented for the MICROSOFT WINDOWS operating system, described by Creating Shell Extension Handlers, available from msdn.microsoft.com/en-us/library/windows/desktop/cc144067, which is hereby incorporated by reference in its entirety. In some embodiments, the facility manages the operation of local proxies as a matter of the native functioning of one or more operating systems, such as by including specialized logic in operating system code that handles, for example, opening, reading, and writing files. In some embodiments, such native operating system implementations are implemented in a manner similar to file a compression and/or encryption capabilities that are native to various operating systems.

By operating in some or all of the ways described above, the facility enables legacy tools to interoperate with cloud-native documents in the manner that the legacy tools respect to be able to interoperate with local, monolithic documents.

Hardware

FIG. 1 is a network diagram showing the environment in which the facility operates in some embodiments. The network diagram shows clients 110 each being used by a different user. Each of the clients executes software enabling its user to create, revise, and present electronic documents. Software on the client also enables the client to retrieve and synthesize remotely-stored document contents, including document fragments. In particular, the Internet 120 or one or more other networks connect each of the clients to a number of different data centers, e.g., data centers 131, 141, and 151, which in some embodiments are distributed geographically to provide disaster and outage survivability, both in terms of data integrity and in terms of continuous availability. Distributing the data centers geographically also helps to minimize communications latency with clients in various geographic locations. Each of the data centers contain servers, e.g. servers 132, 142, and 152. The servers access storage devices containing document contents, including document fragments, and execute software for responding to requests from clients and other servers to store and retrieve document contents, again including document fragments. In various embodiments, the facility uses various different distributions of responsibility for retrieving and combining document fragments between the clients and the servers.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different devices may be used as clients, including desktop computer systems, laptop computer systems, automobile computer systems, tablet computer systems, smart phones, personal digital assistants, televisions, cameras, etc.

Figure 2:
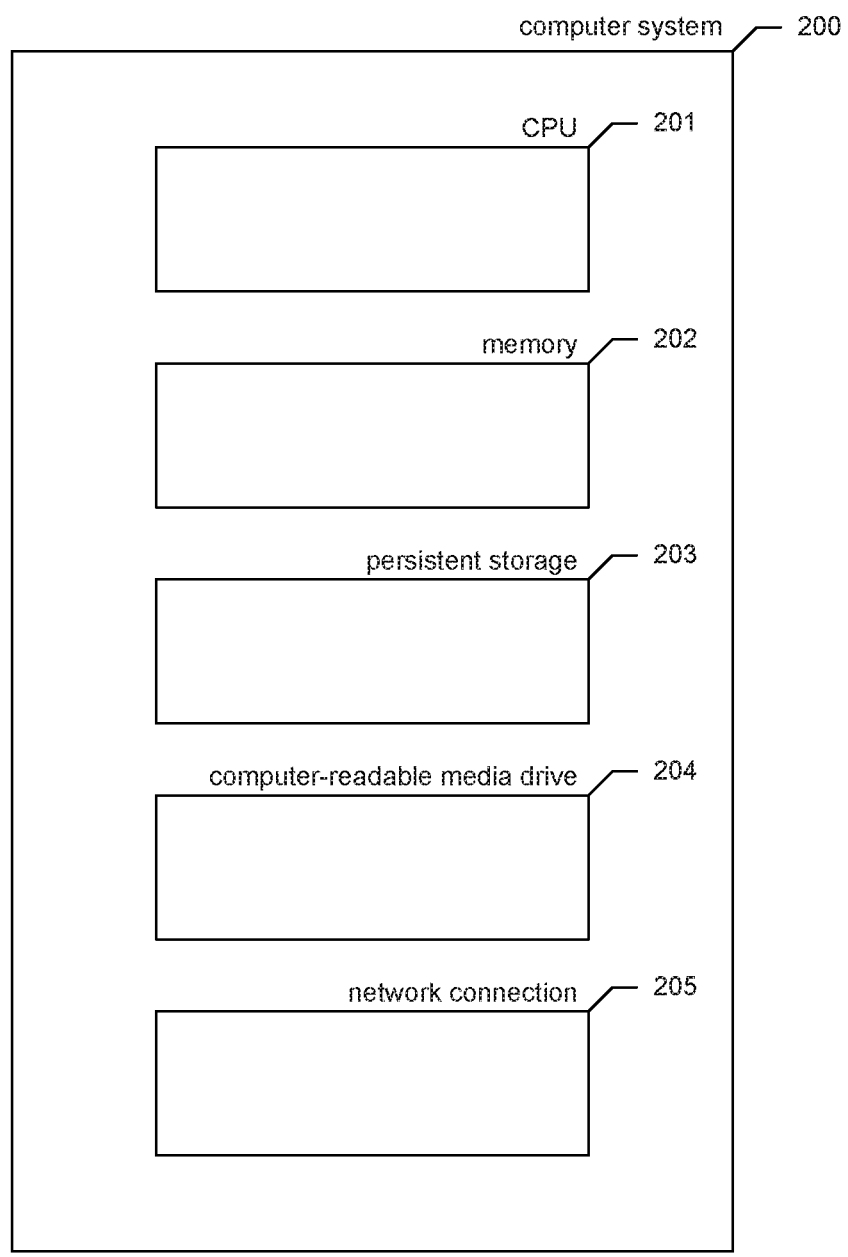
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Fragment Management and Incorporation

A user can incorporate pre-existing content into a target document by, for example, selecting that content within the source document, then performing interactions for transferring the selected content to a particular position in the target document. In various embodiments, such interactions can be, for example, placing the selected content on the clipboard, then pasting it into the target document at the target position; dragging the selected content from the source document to the target position in the target document; etc.

In some embodiments, the facility stores a new version of a fragment to reflect each editing action performed on the fragment, each identified by the date and time at which the editing action was performed. For example, in some embodiments, the facility creates a new fragment version for each character or group of characters that is inserted in the fragment—such as by a keystroke or a text block paste—and for each character or group of characters that is deleted—such as by a backspace keypress or a select-and-delete operation. In some embodiments, each fragment version identifies the author that took the editing action reflected by the fragment version. In some embodiments, after being written, these fragment versions cannot be altered, and are said to be "immutable."

In some embodiments, over time, the facility deletes some of the versions of a fragment, so as to collapse two or more editing actions into an undeleted version of the fragment. In some embodiments, in doing so, the facility deletes only contiguous fragment versions all reflecting editing actions by the same author and immediately preceding an undeleted fragment version also reflecting an editing action by the same author.

In some embodiments, where the content is incorporated from a fragment-aware source document, the facility ensures that the incorporated content corresponds precisely to one or more whole fragments; that is, where the selected content spans only a portion of a fragment in the source document, the facility breaks that fragment in the source document into two fragments, a first that contains only the content from the original fragment that was selected, a second containing the content from the original fragment that was not selected, so that the first can be incorporated into the target document while the second is not. Where the content is incorporated from a fragment-unaware source document, the facility creates a new fragment to contain the incorporated content.

In response to the incorporation operation, the facility creates a fragment reference in the target document at the position in the target document where the content was incorporated to represent the incorporated content in the target document. In some embodiments, the fragment reference contains multiple components, such as a current fragment ID component and/or an original component. The current fragment ID component of the created fragment reference identifies the fragment to which the reference refers, such as by containing a fragment ID for this fragment that can be used to retrieve this fragment. The origin component, where used by the facility, maintains in the fragment reference state the fragment ID of the fragment in which the incorporated content originated, which can serve as a basis for changing the mode in which the incorporated content is used in the target document throughout the life of the fragment reference, and for tracking the provenance of the fragment. In some embodiments, the facility stores an ordered list of fragment IDs in the origin component to reflect the series of fragments from which the referenced fragment has been forked.

In various embodiments, at the time the user performs the incorporation operation, the user can specify an initial mode for the incorporated content in the target document by, for example, holding down a certain keyboard key during the drag interaction, using a varying control key combination to paste the incorporated content into the target document, responding to a context menu or dialog displayed by the facility in response to the incorporation operation, etc. In some embodiments, each mode has two characteristics: (1) whether the contents of the fragment are editable in the context of the incorporating document or fragment ("editable in context") and (2) how a version of the referenced fragment is chosen for inclusion in the incorporating document or fragment ("version selection"). In some embodiments, the following kinds of version selection options are available: (a) "latest"—the version of the fragment with the most recent time is incorporated by the reference; (b) "time-specified"—a particular version of the fragment associated with a particular time is incorporated by the reference (e.g., in some embodiments, an arbitrarily specified time causes selection of the fragment version whose time is the latest among the fragments that are not later than the specified time); (c) "special"—special rules are used to specify which version of the fragment is selected for incorporation. Examples of special rules are the latest document approved by a qualified approval authority, or the earliest version embodying an edit by a particular author.

In various embodiments, the facility supports some or all of the following incorporation modes: live mode, follow mode, forkable mode, pinned mode, special forkable mode, and special follow mode.

Live mode (1) is editable in context and (2) uses "latest" version selection. Thus, in live mode, an author can change the content of the fragment, which results in a new version of the fragment being created to reflect each such change. These changes will appear in any other containing fragments that incorporate the same fragment, and whose version selection option ends up selecting this version, either (a) latest, or (b) special with a selection rule that selects this version. Live mode is typically used for a reference included to both revise the referenced fragment, and reflect the revisions of others. By virtue of using the latest version selection option, a reference in live mode incorporates the latest version of the fragment, no matter its content or which authors' revision it reflects. Where live mode is selected, the facility populates a current fragment ID component of the fragment reference with the same fragment ID as the origin component. The current component of the fragment reference identifies the fragment whose contents are to be retrieved for inclusion in the target document.

Follow mode (1) is not editable in context, and (2) uses latest version selection. In follow mode, the latest version of the fragment is always incorporated, but can't be edited in the context of the document or fragment containing the follow mode reference. Follow mode is typically used to incorporated dynamic content maintained by one or more other authors, in a centralized manner.

Forkable mode (1) is editable in context, and (2) uses time-specified version selection. In forkable mode, the fragment can be edited in the context of the reference from the fragment's state at the specified time. Performing such an edit transforms the reference from forkable mode to live mode; reflects the edit in the first version of a new fragment ID; stores the new fragment ID in the context of the reference; and stores the original fragment ID in the reference's origin component. Forkable mode is typically used where a particular state of a fragment is to be the basis for a new set of edits that won't affect documents or fragments incorporating the original fragment. Similarly, the forkable and resulting live reference aren't affected by edits to the original fragment subsequent to the forkable reference version selection time.

Pinned mode (1) is not editable in context, and (2) uses time-specified version selection. While the fragment reference is in pinned mode, the incorporated content cannot be changed, either by a user editing the document or fragment containing the pinned reference (because not editable in context precludes editing by such an author), or by a user editing the fragment in the context of a different containing document or fragment (because such edits will be reflected in a new version of the fragment, which will not be selected by the time-specified selection logic of this reference). Where pinned mode is selected, the facility populates the current component of the fragment reference with the fragment ID of the origin fragment. Pinned mode is typically used to preserve a particular state of the fragment in the referring document.

Special forkable mode (1) is editable in context, and (2) specifies a special version selection rule. The incorporated fragment will, at any given time, show the content of the version of the source fragment that is selected by the special version selection rule at the time. When an author edits the fragment in context, the forking process described above occurs. Special forkable mode can be used, for example, to use an evolving template whose edits are subject to periodic approval as a basis for creating instances of new content.

Special follow mode (1) is not editable in context, and (2) specifies a special version selection rule. Thus, a special follow reference shows the version of the fragment that satisfies the version selection rule at any given time, which is not editable in context. This mode can be used, for example, to pull into a document or fragment centrally-authored content that is periodically rereleased by its authors to reflect all edits occurring since the last release.

A user may at any subsequent time change the mode of the incorporated content via various user interface techniques, such as by right-clicking on the incorporated content and selecting an item from a resulting context menu, selecting incorporated content and choosing a menu-bar menu item, interacting with a specialized control that is displayed when the mouse cursor hovers over the incorporated content, etc. In some embodiments, the facility incorporates or interoperates with a system of authority and access controls and other content governance measures limit the actions that can be taken by a particular user with respect to a particular document or fragment in various circumstances, including changing the mode of an existing fragment reference.

In some embodiments, when retrieving the time-specified fragment version for content incorporated in pinned mode, the facility notifies the user if a version of the origin fragment that is more recent than the read-only fragment to enable the user to switch the mode to live, or remain in pinned mode but replace the time specified for the version in the reference with the time corresponding to the latest version.

In some embodiments, the facility maintains metrics on the incorporation of fragments into documents to be able to report on various "hot fragments" measures, which identify fragments that are incorporated into the most total documents, or fragments that have been incorporated into the most documents during a recent period of time, across an organization or another group of users, among a group or category of documents, etc.

Figure 5:
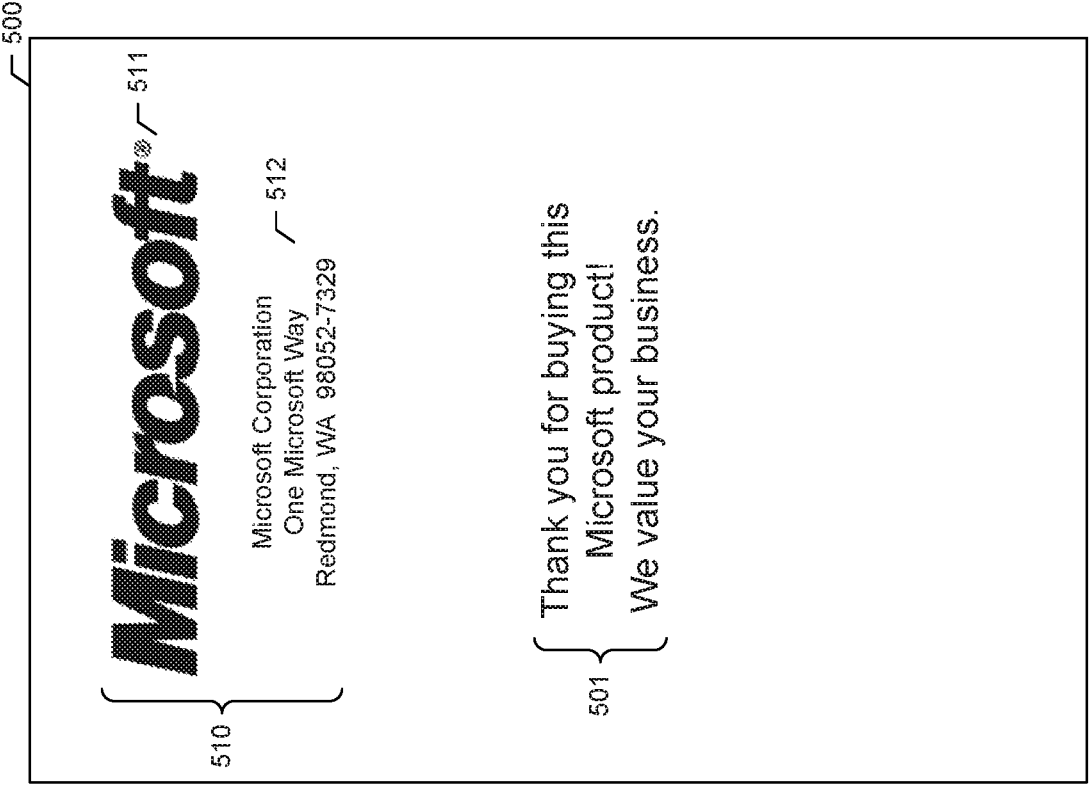
Figure 4:
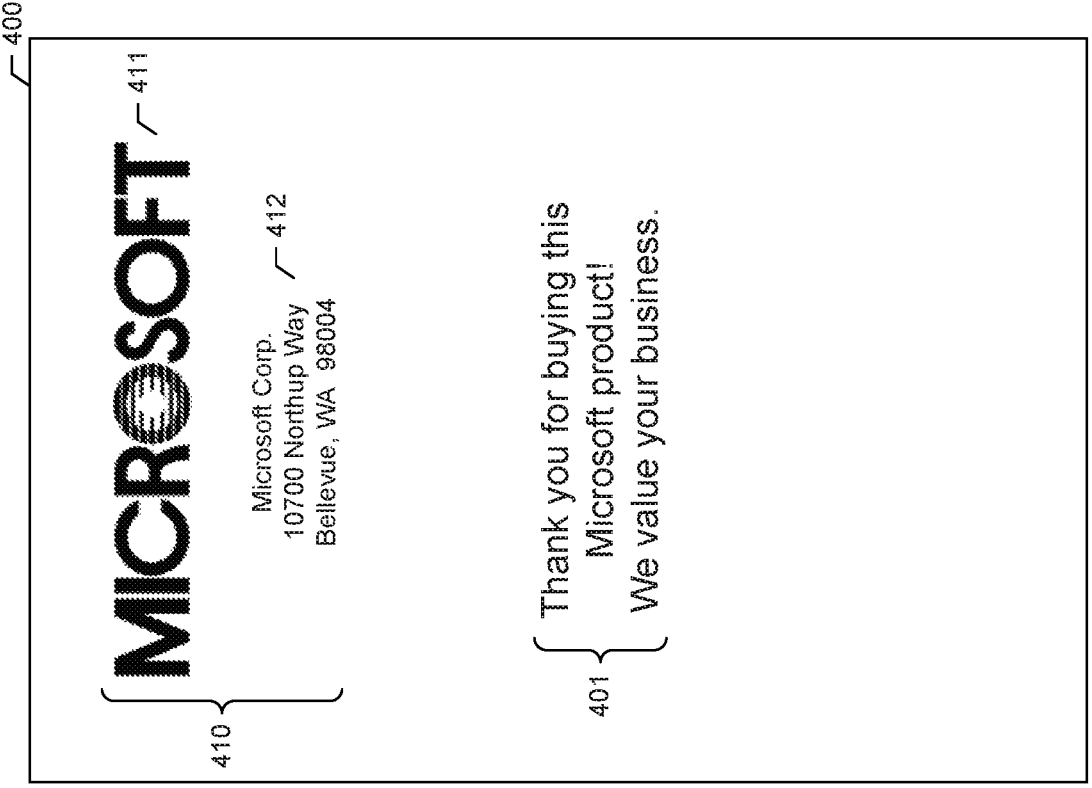

FIGS. 3-5 are display diagrams showing the editing and display of a document incorporating a shared document fragment. FIG. 3 is a display diagram showing a sample target document at a time before the shared document fragment is incorporated. The target document 300 includes text 301. This text may be directly contained by the root fragment for the target document, or may be contained by a fragment identified by a fragment reference within the root fragment for the target document.

FIG. 4 is a display diagram showing the sample target document at a time immediately after the shared document fragment is incorporated. At this time, the target document 400, in addition to containing text 401, contains incorporated content 410 transferred from a source document (not shown). The incorporated content constitutes a company's letterhead, including both an image 411 of the company's logo and the company's textual address 412.

Where the user incorporates the letterhead content in pinned mode, the letterhead content will remain unchanged in the target document unless and until the incorporation is changed to a different mode. Where the user incorporates the letterhead content in forked mode, the user can change the letterhead content in the context of the target document; such changes will not affect the letterhead content in the source document, and any changes to letterhead content in the source document will not be reflected in the target document. Where the user incorporates the letterhead content in live mode, the user can, subject to any applicable permissions, change the letterhead content in the context of the target document, and doing so will change the letterhead content in the source document and any other document that incorporates the letterhead content in live mode. Similarly, changes to the letterhead content via the source document or any other document that incorporates the letterhead content in live mode will be reflected in the target document.

FIG. 5 is a display diagram showing the sample target document where, after the shared document fragment is incorporated into the target document in live mode, the content is changed in the context of the source document, such as by another user. It can be seen that, in the target document 500 at this time, the letterhead content 510 contains a new company logo 511 and a new company address 512, both substituted in the context of the source document, and reflected in the target document pursuant to the target document's incorporation of this content in live mode.

Figure 6:
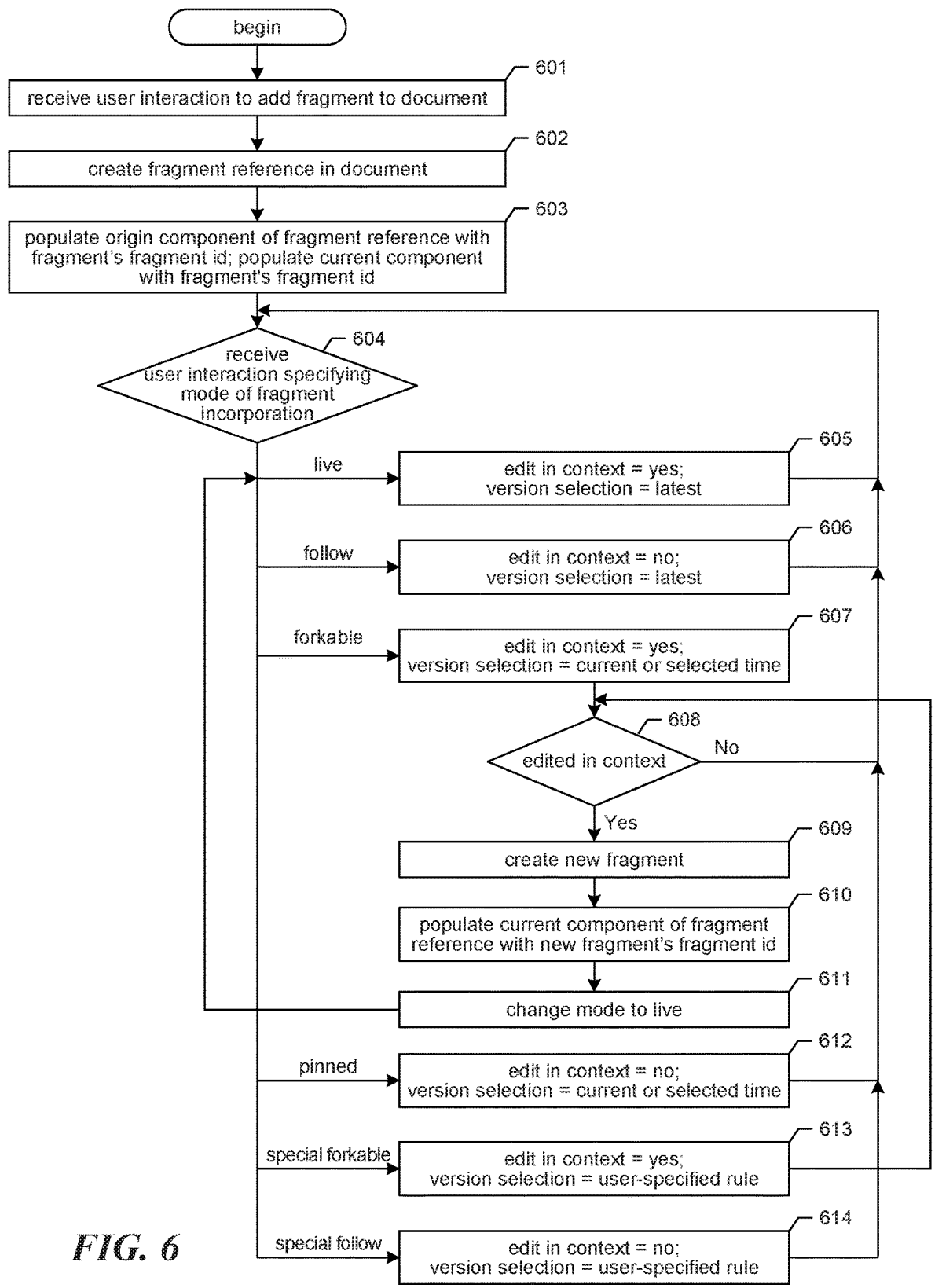
FIG. 6 is a flow diagram showing steps typically performed by the facility in some embodiments in order to incorporate a document fragment into a document, and adjust the mode of its incorporation.

FIG. 6 is a flow diagram showing steps typically performed by the facility in some embodiments in order to incorporate a document fragment into a document, and adjust the mode of its incorporation. In step 601, the facility receives a user interaction to add a fragment to a target document. In various embodiments, such interactions can be, for example, copying the selected content onto the clipboard, then pasting it into the target document at the target position; dragging the selected content from the source document to the target position in the target document; etc. Where the user selects content to add to the target document that don't exactly correspond to whole existing fragments, the facility creates one or more fragments to which the selected content does exactly correspond, such as by subdividing fragments that occur in the source document. In some cases, this involves altering and/or adding fragment references in the source document, and in one or more other documents incorporating the same content in live mode.

In step 602, the facility creates a fragment reference in the target document. In step 603, the facility populates both the origin component of the fragment reference and its current component with the fragment ID of the fragment added to the document. In step 604, the facility receives a user interaction specifying a mode for incorporating the fragment in the target document. In some embodiments, a single interaction or a related sequence of interactions can both add the fragment to the document and specify a mode. If the user action received in step 604 specifies the live mode, then the facility continues in step 605; if it specifies the follow mode, then the facility continues in step 606; if it specifies the forkable mode, then the facility continues in step 607; if it specifies the pinned mode, then the facility continues in step 612; if it specifies the special forkable mode, then the facility continues in step 613; and if it specifies the special follow mode, then the facility continues in step 614.

In step 605, where the live mode is specified, the facility sets edit in context to yes for the reference, and sets version selection to latest. After step 605, the facility continues in step 604 to permit the user to, at a later time, specify a new mode for this fragment. In step 606, where the follow mode is specified, the facility sets edit in context to no for the reference, and sets version selection to latest. After step 606, the facility continues in step 604. In step 607, where the forkable mode is specified, the facility sets edit in context to yes for the reference, and sets version selection to the current time, or an earlier time selected by the user. In step 608, if the user chooses to edit the fragment in the context of the reference, then the facility continues in step 609, else the facility continues in step 604. In step 609, the faculty creates a new fragment that reflects application of the edit of step 608 to the added fragment. The new fragment has a different fragment ID than the added fragment. In step 610, the facility populates the current component of the fragment reference with the new fragment's fragment ID. In step 611, the facility changes the reference's mode to live. After step 611, the facility continues in step 605. In step 612, where the pinned mode is specified, the facility sets edit in context to no for the reference, and sets version selection to the current time, or to an earlier time selected by the user. After step 612, the facility continues in step 604. In step 613, where the special forkable mode is specified, the facility sets edit in context to yes, and sets version selection to a version selection rule, such as a version selection rule specified via additional user interactions, a default version selection rule, an inferred version selection rule, etc. After step 613, the facility continues in step 608. In step 614, where the special follow mode is specified, the facility sets edit in context to no, and sets version selection to a version selection rule in a manner similar to step 613. After step 614, the facility continues in step 604.

Those skilled in the art will appreciate that the steps shown in FIG. 6 and in each of the flow diagrams discussed below may be altered in a variety of ways. For example, the order of the steps may be rearranged; some steps may be performed in parallel; shown steps may be omitted, or other steps may be included; a shown step may be divided into sub steps, or multiple shown steps may be combined into a single step, etc.

Figure 7:
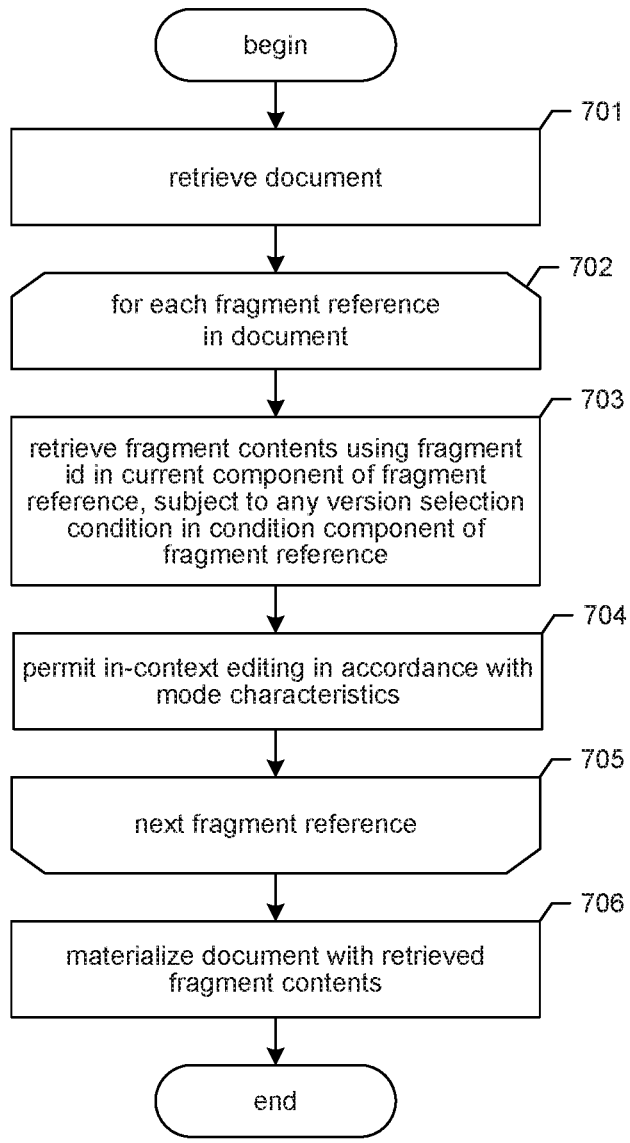
FIG. 7 is a flow diagram showing steps typically performed by the facility in some embodiments in order to materialize a document containing shared fragments.

FIG. 7 is a flow diagram showing steps typically performed by the facility in some embodiments in order to materialize a document containing shared fragments. In various embodiments, the facility performs these steps when a document is opened, when a document needs to be displayed, when a user attempts to add it to document, etc. In various embodiments, the facility's performance of these steps is distributed between the client and servers in various ways. In step 701, the facility retrieves a document, such as by retrieving its root fragment. The facility loops through steps 702-704 for each fragment reference occurring in the document, including transitive fragment references from one fragment to another. In step 703, the facility retrieves content of the fragment using the fragment ID contained in the current component of the fragment reference. This retrieval is subject to any version selection condition contained in the condition component of the fragment reference; that is, the retrieval is performed with respect to the latest version of the fragment that specifies any contained version selection condition, or, absent a version selection condition, the latest version of the fragment. In various embodiments, the facility uses various forms of fragment version selection logic. In some embodiments, the process of retrieving a fragment indicates permissions associated with the fragment, including whether the fragment can be edited by the current user, which the facility uses to indicate and control whether the user can edit the fragment in the context of the document. Fragment retrieval is discussed in greater detail below in connection with FIGS. 8-11. In step 704, the facility makes the fragment editable in context based on the mode of the fragment reference. In step 705, if additional fragment references remain to be processed, then the facility continues in step 702 to process the next fragment reference, else the facility continues in step 706. In step 706, the facility materializes the document using the fragment contents retrieved in step 703. After step 706, these steps conclude. In some embodiments (not shown), rather than performing the processing shown in FIG. 7 in a loop, the facility performs it as a recursive descent of a tree-like graph with lenses acting as parents of content nodes, and modifying rendering behavior as the document is materialized.

Figure 8:
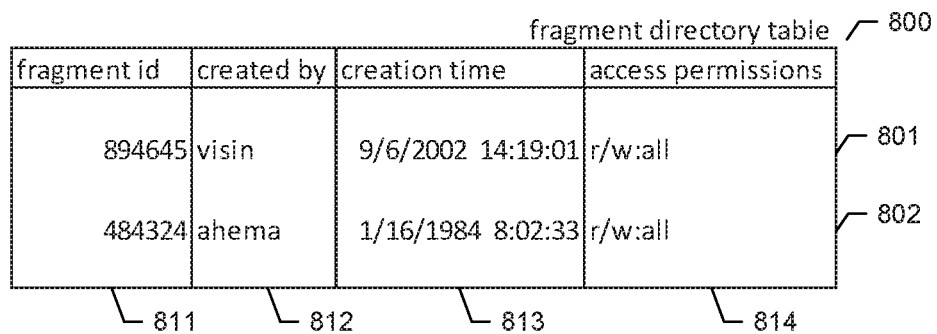
FIG. 8 is a table diagram showing sample contents of a fragment directory table used by the facility in some embodiments to store information about fragments.
Figure 9:
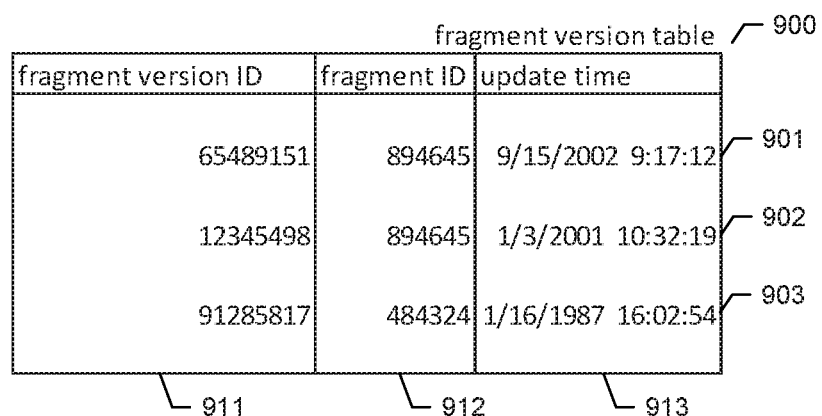
FIG. 9 is a table diagram showing sample contents of a fragment version table used by the facility in some embodiments to store information about fragment versions.

FIG. 8 is a table diagram showing sample contents of a fragment directory table used by the facility in some embodiments to store information about fragments. In some embodiments, the fragment directory table, and the other tables described in FIGS. 9-11, are stored in a data center on a storage device accessible to servers executing server software that is part of the facility. In some embodiments, some or all of these tables are stored in multiple data centers in order to provide survivability and a measure of locality for the data they store. The fragment directory table 800 is made up of rows such as rows 801-802 each corresponding to a different fragment. Each row is divided into the following columns: a fragment ID column 811 containing a fragment ID identifying the fragment to which the row corresponds; a created by column 812 containing information identifying a user that created the fragment; a creation time column 813 having contents indicating the time at which the fragment was created; and an access permissions column 814 specifying the ways in which the fragment can be accessed by various users. For example, row 801 indicates that a fragment having fragment ID 894645 was created by user visin at Sep. 6, 2002 14:19:01, and can be read and written by all users. In some embodiments, the facility employs geographically-invariant times, such as times expressed in Greenwich Mean Time, in order to coordinate servers and clients located in different time zones. Where the server receives a retrieval request for fragment ID 894645, it uses row 801 to determine access permissions for this fragment.

While FIG. 8 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

FIG. 9 is a table diagram showing sample contents of a fragment version table used by the facility in some embodiments to store information about fragment versions. In particular, the facility uses the fragment version table to identify the different versions of a fragment that exist, and their time order. In some embodiments, the facility maintains only a single version of each fragment, in which case the fragment version table is not necessary, and fragment IDs are substituted for fragment version IDs in other tables maintained by the facility. The fragment version table 900 is made up of rows such as rows 901-903 each corresponding to a different fragment version. Each of the rows is divided into the following columns: a fragment version ID column 911 containing a fragment version ID for the fragment version to which the row corresponds that uniquely identifies this fragment version; a fragment ID column 912 containing the fragment ID identifying the fragment to which this fragment version corresponds; and an update time column indicating the time at which the fragment version was last updated. For example, row 901 indicates that the fragment version having fragment version ID 65489151 corresponds to the fragment having fragment ID 894645, and was last updated at Sep. 15, 2002 9:17:12. Where the server receives a retrieval request for fragment ID 894645, it uses rows 901 and 902 to identify the two fragment versions that exist for this fragment ID. These two rows can also be used to determine which of the fragment versions is more recent.

In some embodiments, where fragment versions are used, some fragment versions are writeable, such that an author can change the content at a time after it is created, at least in the case of fragment versions that are not referenced by any pinned fragment references. However, in some embodiments, every fragment version is read-only, and any revision of content contained by an existing fragment version causes the facility to create a new fragment version. In various embodiments, the creation of a new fragment version occurs at various levels of granularity, including a new fragment version for each editing session, a new fragment version for each keystroke, or at some level in between, such as every five seconds, every minute, every 15 minutes, etc.

FIG. 10 is a table diagram showing sample contents of a fragment version instance table used by the facility in some embodiments to store information about fragment version instances. In particular, the facility uses the fragment version instance directory table to identify, for particular fragment version, instances of the fragment version that are stored on different servers, so that the facility can choose one of the fragment version instances for retrieval, and so that, if a fragment version is being changed in an embodiment where this is possible, every instance of it can be changed or invalidated. The fragment version instance directory table 1000 is made up of rows such as rows 1001-1008 each corresponding to a different combination of a fragment version and a server on which an instance of the fragment version is stored. Each row is divided into the following columns: a fragment version ID column 1011 containing if fragment version ID identifying the fragment version; and a server ID column 1012 identifying a server on which an instance of the fragment version is stored. For example, row 1001 indicates that the fragment version having fragment version ID 12345498 has an instance stored on the server having server ID 9103. In various embodiments, the facility uses various other approaches to identifying locations in which instances of fragment versions are stored, such as by using data center IDs, storage device IDs, etc.

FIG. 11 is a table diagram showing sample contents of a fragment version instance content table used by the facility in some embodiments to store fragment version instance content. The fragment version instance content table 1100 is made up of rows such as rows 1101-1103 each corresponding to fragment version instances all stored on a particular server. The fragment version instance content table 1100 is, in particular, stored on the server having server ID 9103. Each of the rows is divided into the following columns: a fragment version ID column 1111 containing the fragment version ID identifying the fragment version to which the row corresponds; an update time column 1112 indicating the time at which the fragment version instance was last updated; and a fragment contents column 1113 containing the contents of the fragment version instance. For example, row 1101 indicates that the fragment version instance having fragment version ID 91285817 and update time Jan. 16, 1987 16:02:54 contains particular image data. It is the fragment 1113 that contains the data that the facility returns in response to a fragment retrieval request.

In some embodiments, rather than storing each fragment version instance as a single entity as shown in FIG. 11, the facility employs an "erasure coding" technique in which it distributes the contents of each fragment version instance as any number of smaller shreds, which can be stored on any arrangement of servers.

In some embodiments, the facility stores shreds in the same manner as fragments. In some embodiments, the facility uses a variety of other mechanisms for storing shreds.

In various embodiments, the reconstitution of fragments from shreds is performed (1) exclusively by one or more servers providing the cloud service; (2) exclusively by the client system; or (3) by the collaborative effort of cloud servers and client system. In various embodiments, the materialization of documents from fragments is performed (1) exclusively by one or more servers providing the cloud service; (2) exclusively by the client system; or (3) by the collaborative effort of cloud servers and client system.

Local Proxies

Figure 12:
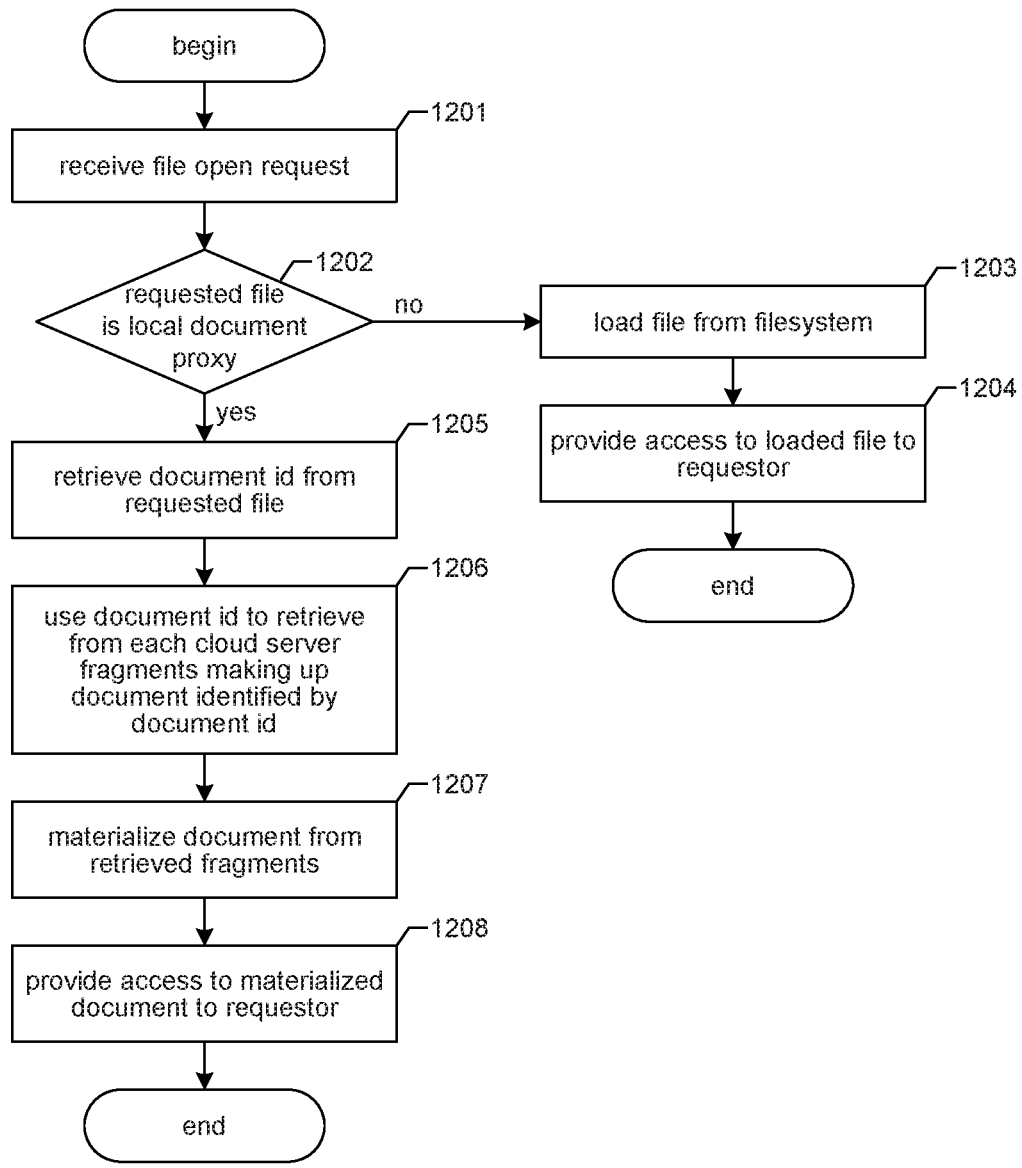
FIG. 12 is a flow diagram showing steps typically performed by the facility in some embodiments in order to open a file that may be a local document proxy.

FIG. 12 is a flow diagram showing steps typically performed by the facility in some embodiments in order to open a file that may be a local document proxy. As noted above, in some embodiments the facility performs these steps using an operating system extensibility mechanism such as Shell Extension Handlers; in some embodiments, the facility performs these steps as part of the native functioning of one or more operating systems.

In step 1201, the facility receives a file open request from a requester. The requester may be a legacy tool, or any other program seeking to open a file stored in the file system, stored in the payload of an email message or other transmission data structure, etc. In step 1202, if the requested file is a local document proxy, then the facility continues in step 1205, else the facility continues in step 1203. In various embodiments, the facility performs step 1202 by checking the file extension of the requested file, or another indication of the requested file's file type.

Figure 13:
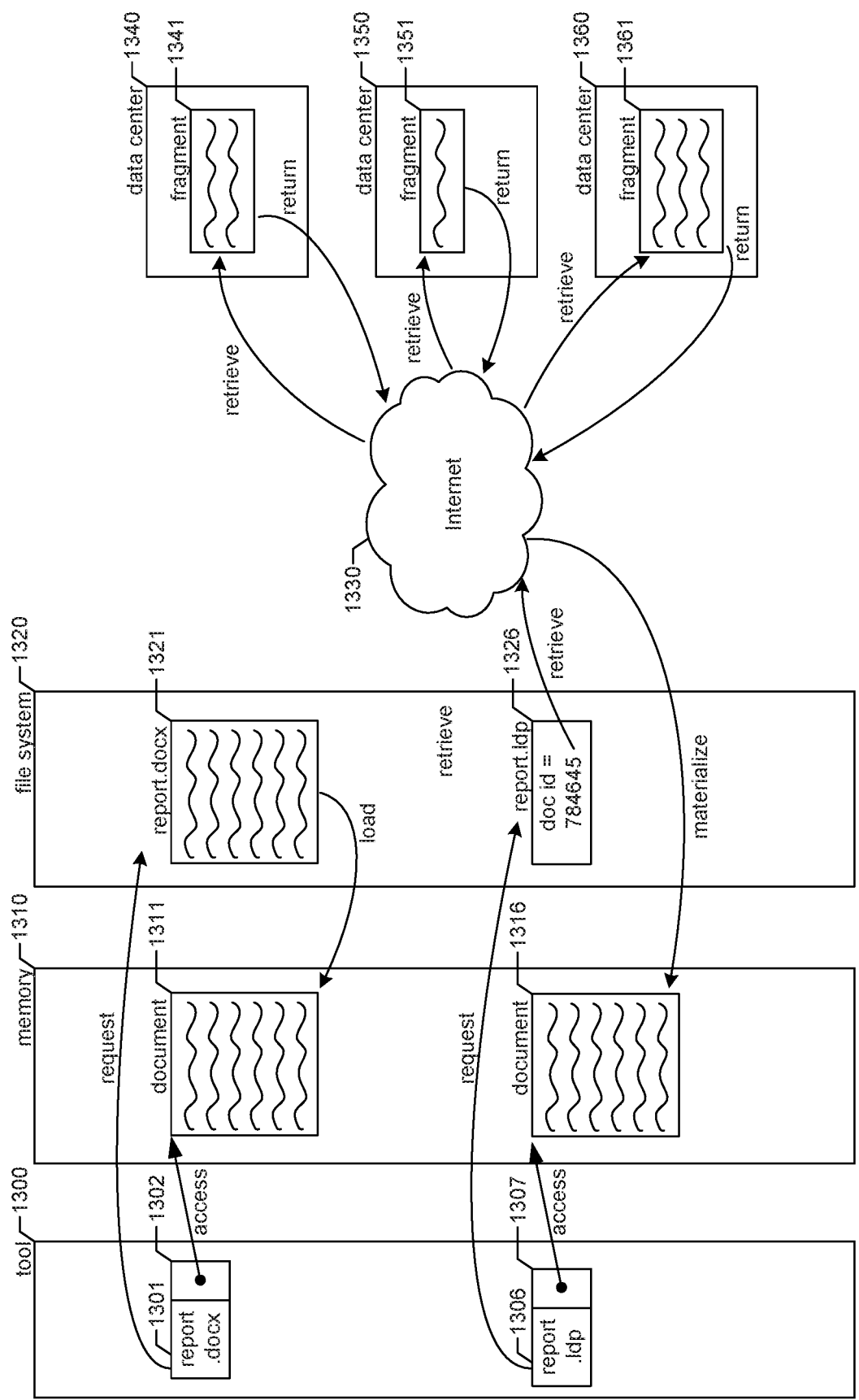
FIG. 13 is a data flow diagram showing interactions typically performed in the facility in some embodiments in order to provide access to a cloud-native document via a local document proxy.

FIG. 13 is a data flow diagram showing interactions typically performed in the facility in some embodiments in order to provide access to a cloud-native document via a local document proxy. The data flow in FIG. 13 substantially tracks the steps in FIG. 12. FIG. 13 shows that the tool 1300 makes a request 1301 for a report.docx file. In step 1202, the facility determines that the requested file is not a local document proxy, based upon its file type and file extension not being "ldp," thus the facility continues in step 1203.

Returning to FIG. 12, in step 1203, the facility loads the file requested in step 1201 from the file system. FIG. 13 shows the report.docx file 1321 being loaded from the filesystem 1320 into memory 1310 is document 1311.

Returning to FIG. 12, in step 1204, the facility provides access to the file loaded in step 1203 to the requester. After step 1204, these steps conclude. FIG. 13 shows that the tool receives a pointer 1302 that it can use to access the loaded document 1311 in memory. FIG. 13 also shows a second request 1306 from the tool for a report.ldp file. In step 1202, the facility determines that, unlike the requested report.docx file, the report.ldp file 1326 is a local document proxy, based upon its file type and file extension being "ldp."

Returning to FIG. 12, in step 1205, where the requested file is a local document proxy, the facility retrieves a cloud-native document ID from the file requested in step 1201. FIG. 13 shows that the document ID contained by and retrieved from the report.ldp file is 784645.

Returning to FIG. 12, in step 1206, the facility uses the document ID retrieved in step 1205 to retrieve from each cloud server fragments making up the document identified by the document ID. FIG. 13 shows the retrieval from different cloud servers of fragments 1341, 1351, and 1361 making up the cloud-native document identified by document ID 784645.

Returning to FIG. 12, in step 1207, the facility materializes the cloud-native document from the fragments retrieved in step 1206. FIG. 13 shows the materialization of document 1316 from retrieved fragments 1341, 1351, and 1361.

Returning to FIG. 12, in step 1208, the facility provides access to the document materialized in step 1207 to the requester. After step 1208, the steps conclude. FIG. 13 shows that the tool receives a pointer 1307 to materialize a document 1316, which it can use to access the materialized document.

Thus, the tool is able to access the temporary local representation 1316 of the cloud native document in the same way it can access the local, monolithic document 1311. While FIGS. 12 and 13 reflect a particular technique for permitting a tool or another program to access the contents of files that involves loading those contents into memory, those skilled in the art recognize that various operating systems provide various other techniques for programs to access the contents of files. In various embodiments, the facility employs different techniques for this purpose in order to match the normal functioning of the operating system.

Though not shown, as noted above, in some embodiments, the facility enables the tool or other accessing program to modify the contents of the document it requests. Where the tool or other accessing program does modify the contents of the document it requests, if the requested file is a local document proxy, in some embodiments, the facility takes actions needed to reflect these modifications in the cloud service's representation of the cloud-native document.

In some embodiments, the facility provides a cloud server computing system. The cloud server computing system comprises: a receiving subsystem configured to receive from a separate client computing system a retrieval request to return a document identified by a document identifier contained by the retrieval request, the retrieval request having been originated by the client computing system in response to an open request for a file stored on the client computing system, the file containing the document identifier; and a transmission subsystem configured to transmit to the client a response containing at least a portion of a document to which the document identifier contained by the retrieval request corresponds. Each of these subsystems is a computing-related entity, comprising either hardware, a combination of hardware and software, software, or software in execution on a computer.

In some embodiments, the facility provides a method in a cloud server computing system. The method comprises: receiving from a separate client computing system a retrieval request to return a document identified by a document identifier contained by the retrieval request, the retrieval request having been originated by the client computing system in response to an open request for a file stored on the client computing system, the file containing the document identifier; and transmitting to the client a response containing at least a portion of a document to which the document identifier contained by the retrieval request corresponds.

In some embodiments, the facility provides a computer-readable medium having contents configured to cause a computing system having an operating system to, in order to access a cloud-native document: receive an open request to open a specified file; determine that the specified file is of a selected type; in response to determining that the specified file is of a selected type: extract from the specified file an identifier identifying the cloud-native document, issue one or more network requests each to a cloud-based server, each for a portion of the cloud-native document, at least one of the requests containing the extracted identifier, and return in response to the open request information usable to access a temporary local representation of the cloud-native document assembled from portions of the cloud-native document to which the issued network requests correspond.

In some embodiments, the facility provides a method in a computing system having an operating for accessing a cloud-native document. The method comprises: receiving an open request to open a specified file; determine that the specified file is of a selected type; in response to determining that the specified file is of a selected type: extract from the specified file an identifier identifying the cloud-native document, issuing one or more network requests each to a cloud-based server, each for a portion of the cloud-native document, at least one of the requests containing the extracted identifier, and returning in response to the open request information usable to access a temporary local representation of the cloud-native document assembled from portions of the cloud-native document to which the issued network requests correspond.

In some embodiments, the facility provides a computer-readable medium storing a file data structure. The data structure comprises: information usable to retrieve a document to which the file data structure corresponds from a cloud-based document management system.

CONCLUSION

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A server computing system, comprising:
one or more servers implementing a receiving subsystem, a transmission subsystem, and an assembly subsystem, wherein
the receiving subsystem is configured to, when a proxy request to return a local proxy of a cloud-native document accessible through a cloud-based service is received from a separate client computing system, create a file proxy containing a document identifier,
the transmission subsystem is configured to transmit, to the client computing system, as a response to the proxy request, the file proxy containing the document identifier,
the assembly subsystem is configured to, when a legacy tool attempts to access the file proxy in a same manner as the legacy tool accesses a monolithic document stored locally on the client computing system, materialize a temporary local representation of the cloud-native document for the legacy tool using the document identifier and make the temporary local representation of the cloud-native document available to the legacy tool, and
the materializing of the temporary local representation includes retrieving fragments associated with the cloud-native document.

2. The server computing system of claim 1, wherein the receiving subsystem is further configured to receive the proxy request while a user of the client computing system is interacting with the cloud-native document through the cloud-based service.

3. The server computing system of claim 1, wherein the file proxy transmitted to the client computing system is usable by the client computing system to perform at least one selected from a group consisting of storing the file proxy on a local storage device, uploading the file proxy to a cloud-based storage service, publishing the file proxy to a social media site, and transmitting the file proxy to a recipient via an electronic message.

4. The server computing system of claim 1, wherein the file proxy includes a file extension distinct from the monolithic document stored locally on the client computing system.

5. The server computing system of claim 1, wherein the receiving subsystem is further configured to:
determine that the legacy tool is attempting to access the file proxy in the same manner as the legacy tool accesses the monolithic document stored locally on the client computing system when a retrieval request to return the cloud-native document identified by the document identifier contained in the retrieval request is received from the client computing system,
retrieve a first fragment associated with the document identifier from at least one data center, the first fragment including first content to be included in the cloud-native document and a reference to a second fragment, and
retrieve the second fragment, the second fragment including second content to be included in the cloud-native document.

6. The server computing system of claim 5, wherein the assembly subsystem is configured to materialize the temporary local representation of the cloud-native document for the legacy tool by assembling the first content and the second content to form at least a portion of the cloud-native document to which the document identifier contained by the retrieval request corresponds to.

7. The server computing system of claim 6, wherein the transmission subsystem is further configured to transmit to the client computing system a response to the retrieval request, the response including at least the portion of the cloud-native document to which the document identifier contained by the retrieval request corresponds.

8. The server computing system of claim 1, wherein the receiving subsystem is further configured to:
determine that the legacy tool is attempting to access the file proxy in the same manner as the legacy tool accesses the monolithic document stored locally on the client computing system when a retrieval request to return the cloud-native document identified by the document identifier contained in the retrieval request is received from the client computing system, and
receive from one or more other cloud server computing systems constituent elements of the cloud-native document to which the document identifier contained by the retrieval request corresponds that the assembly subsystem is configured to assemble.

9. The server computing system of claim 8, wherein the transmission subsystem is further configured to transmit, to the one or more other cloud server computing systems, requests for the constituent elements of the cloud-native document to which the document identifier contained by the retrieval request corresponds that the assembly subsystem is configured to assemble.

10. The server computing system of claim 1, wherein the legacy tool attempting to access the file proxy includes the legacy tool attempting to open, read or write to the file proxy.

11. The server computing system of claim 1, wherein the server computing system is further configured to: identify local file proxies based on assigning the local file proxies a file type or a file extension in advance that distinguishes the local file proxies from files that are not the local file proxies.

12. A method for accessing cloud-native documents, the method comprising:
when a proxy request to return a local proxy of a cloud-native document accessible through a cloud-based service is received by a server system from a separate client computing system, creating, with the server system, a file proxy containing a document identifier, and transmitting, with the server system, as a response to the proxy request to the client computing system, the file proxy containing the document identifier; and
when a legacy tool attempts to access the file proxy in a same manner as the legacy tool accesses a monolithic document stored locally on the client computing system, materializing, with the server system, a temporary local representation of the cloud-native document for the legacy tool using the document identifier and making, with the server system, the temporary local representation of the cloud-native document available to the legacy tool, wherein the materializing of the temporary local representation includes retrieving fragments associated with the cloud-native document.

13. The method of claim 12, wherein the file proxy transmitted to the client computing system is usable by the client computing system to perform at least one selected from a group consisting of, storing the file proxy on a local storage device, uploading the file proxy to a cloud-based storage service, publishing the file proxy to a social media site, and transmitting the file proxy to a recipient via an electronic message.

14. The method of claim 12, wherein the creating the file proxy includes setting a file extension of the file proxy distinct from a file extension of the monolithic document stored locally on the client computing system.

15. The method of claim 12, further comprising, with the server system:
   determining that the legacy tool is attempting to access the file proxy in the same manner as the legacy tool accesses the monolithic document stored locally on the client computing system when a retrieval request to return the cloud-native document identified by the document identifier contained in the retrieval request is received from the client computing system;
   retrieving a first fragment associated with the document identifier from at least one data center, the first fragment including first content to be included in the cloud-native document and a reference to a second fragment; and
   retrieving the second fragment, the second fragment including second content to be included in the cloud-native document;
   wherein the materializing the temporary local representation of the cloud-native document for the legacy tool using the document identifier includes assembling the first content and the second content to form at least a portion of the cloud-native document to which the document identifier contained by the retrieval request corresponds to; and
   wherein the making the temporary local representation of the cloud-native document available to the legacy tool includes transmitting to the client computing system a response to the retrieval request, the response including at least the portion of the cloud-native document to which the document identifier contained by the retrieval request corresponds to.

16. A computer memory storing computer program code configured to cause a processor of a server system to:
   when an open request to open a specified file is received:
      extract from the specified file an identifier identifying a cloud-native document, the identifier being usable by multiple client computing systems to request access to the cloud-native document identified by the identifier;
      transmit a network request to a cloud-based server for at least a fragment of the cloud-native document, the request containing the extracted identifier;
      receive a response to the transmitted network request, the response containing at least one fragment of the cloud-native document;
      materialize a temporary local representation of the cloud-native document to include the at least one fragment of the cloud-native document received in the response; and
      return, as a response to the open request, information usable to access the temporary local representation of the cloud-native document; and
   when an edit from a user to the at least one fragment of the cloud-native document included in the temporary local representation of the cloud-native document is received, store a new version of the at least one fragment to the cloud-based server based on the edit.

17. The computer memory of claim 16, wherein the edit includes an insertion of at least one character into the at least one fragment of the cloud-native document included in the temporary local representation of the cloud-native document.

18. The computer memory of claim 16, wherein the edit includes a deletion of at least one character into the at least one fragment of the cloud-native document included in the temporary local representation of the cloud-native document.

19. The computer memory of claim 16, wherein the new version of the at least one fragment of the cloud-native document identifies at least one selected from a group consisting of the user and a date and time the edit was received.

20. The computer memory of claim 16, wherein the computer program code is further configured to cause the processor to set the new version of the at least one fragment of the cloud-native document as immutable after storing the new version of the at least one fragment to the cloud-based server.

* * * * *